United States Patent [19]

Capps

[11] Patent Number: 5,042,336

[45] Date of Patent: Aug. 27, 1991

[54] CONTROL APPARATUS AND METHOD FOR PROGRESSIVE FRACTURE OF WORKPIECES

[76] Inventor: David F. Capps, 134 Moross, Mt. Clemens, Mich. 48043

[21] Appl. No.: 318,816

[22] Filed: Mar. 3, 1989

[51] Int. Cl.$^5$ .......................... B30B 15/22; B26F 1/14
[52] U.S. Cl. .......................................... 83/13; 83/530; 83/617; 100/35; 100/48
[58] Field of Search ................. 83/13, 39, 49, 55, 684, 83/530, 532, 617, 639, 50, 613, 525, 2; 173/81, 127, 1; 100/39, 48, 49

[56] References Cited

U.S. PATENT DOCUMENTS

| | | | |
|---|---|---|---|
| 3,487,736 | 1/1970 | Kaiser et al. | 83/13 |
| 3,566,513 | 3/1971 | Fuller | 83/39 X |
| 3,623,389 | 11/1971 | Krynytzky et al. | 83/617 |
| 3,657,953 | 4/1972 | Sutyak | 83/8 |
| 3,733,943 | 5/1973 | Sutyak | 83/7 |
| 3,827,328 | 8/1974 | LaFlamme et al. | 83/617 |
| 3,888,168 | 6/1975 | Kent et al. | 100/48 |
| 4,088,899 | 5/1978 | Miller et al. | 83/13 X |
| 4,116,122 | 9/1978 | Linder et al. | 100/48 |
| 4,208,935 | 6/1980 | Kollmar | 83/617 |
| 4,214,496 | 7/1980 | Carrieri | 83/617 |
| 4,339,975 | 7/1982 | Carrieri | 83/617 |
| 4,375,781 | 3/1983 | Bessho | 92/52 |
| 4,524,582 | 6/1985 | Lucas et al. | 60/421 |
| 4,694,744 | 9/1987 | Hepburn et al. | 100/214 |
| 4,771,663 | 9/1988 | Naito et al. | 83/530 X |
| 4,945,796 | 8/1990 | Riley | 83/49 |

Primary Examiner—Frank T. Yost
Assistant Examiner—Kenneth E. Peterson
Attorney, Agent, or Firm—Basile and Hanlon

[57] ABSTRACT

A control apparatus and method for progressively fracturing a workpiece from a material sheet in a press in which a ram is progressively advanced through the thickness of the material sheet in discrete steps, each of the discrete steps including an advance of the ram into the material sheet a predetermined distance less than the total thickness of the sheet, a stopping of the advance of the ram, a relief of the pressure built up in the press due to the pressurized advance of the ram and a subsequent advance of the ram through the material sheet. A distance measuring transducer generates an output indicative of the position of the piston of the cylinder and the ram during movement of the ram. A controller, in response to a stored control program and the output of the distance measuring transducer, controls the operation of fluid valves to supply pressurized fluid to the cylinder to reciprocate the ram. The controller controls pressure regulating valves to supply fluid at a plurality of discrete pressures to the cylinder throughout each cycle of operation of the press.

10 Claims, 6 Drawing Sheets

CONTROL APPARATUS AND METHOD FOR PROGRESSIVE FRACTURE OF WORKPIECES

BACKGROUND OF THE INVENTION

Field of the Invention

The present invention relates, in general, to presses and, specifically, to hydraulic presses used in stamping or shearing operations and, more specifically, to control systems for hydraulic presses.

Workpieces are commonly punched or stamped from sheet metal in fluid operated or hydraulic presses. Such presses include a frame having a bed with a lower die mounted thereon. A fluid operated cylinder, such as a hydraulic cylinder, includes a movable piston mounted on the upper portion of the frame which drives a ram or punch having an upper die mounted thereon into a metal sheet disposed between the dies to punch or shear a workpiece from the metal sheet.

As the punch or upper die engages and moves through the metal sheet, forces on the order of several tons are introduced into the dies and the surrounding frame of the press which progressively increase to a maximum force load at the point of breakthrough of the upper die through the metal sheet. The forces are restrained during the shearing or stamping operation and are stored as distortion or deflection in the frame of the press and the dies.

These forces are suddenly released when the upper die breaks through the metal sheet resulting in objectionable shock, noise and vibrations. These loads increase correspondingly with the force employed in the stamping or shearing operation.

The shock, noise and vibrations adversely effect the press, surrounding equipment and persons located in the vicinity of the press. Further, these objections occur with each cycle of the press and increase with the force and size of the press.

Because of the noise and shock generated by presses in stamping and shearing operations, presses have been located in an area separate from other manufacturing operations, such as a separate building or a portion of a large building isolated from other manufacturing operations. This requires shipping, storage and additional handling of the stamped parts which increases their cost and results in the possibility of damage to the parts.

In order to alleviate or minimize the objectionable characteristics of stamping presses, attempts have been made to decrease the noise and vibration generated by a press. Such attempts incorporate shock dampening systems into the press which cushion the release of the stored forces via a hydraulic cylinder, restrictive fluid flow path, etc., in the hydraulic system of the press. Other systems control the speed of the press during its advance so as to decelerate the press when breakthrough of the workpiece occurs in order to minimize the impact of the upper die on the bed and frame of the press.

However, such attempts have met limited success in reducing the noise and vibration levels generated during a stamping or shearing press operation. Further, such attempts require additional components and controls which increases the cost of a press.

Thus, it would be desirable to provide a control system and method for a stamping or shearing press which reduces the noise and vibrations associated with the operation of stamping or shearing presses. It would also be desirable to provide a control apparatus and method for reducing noise and vibration levels in a stamping press which can be easily adapted to conventional press construction.

SUMMARY OF THE INVENTION

The present invention is a control apparatus and method for progressive fracture of a workpiece from a material sheet in a press having a pressurizable fluid-operated cylinder reciprocally moving a punch through the material sheet.

The control apparatus includes a distance measuring means, such as a transducer, connected to the fluid-operated cylinder and providing an output indicative of the position of the piston of the cylinder. Valve means are connected to a fluid source and supply pressurized fluid to the cylinder to extend and retract the cylinder in response to control signals from a control means. The control means executes a stored control program and, in response to the output of the distance measuring means, controls the valve means to extend the ram in a series of discrete steps, each of increasing distance, through the thickness of the material sheet, with each step including a stoppage of the advance of the punch at a predetermined distance less than the total thickness of the sheet, and a release of the pressure on the press due to the pressurized advance of the ram through the material sheet before advancing to the next incremental advance position within the thickness of the material sheet.

In a preferred embodiment, the control means, which comprises a controller in the form of a microprocessor based computer which executes a control program stored in memory, generates control signals to the valve means to advance and retract the cylinder and thereby the ram in a series of increasing distances through the total thickness of the material sheet, with the number of discrete steps or distances being dependent upon the thickness of the material sheet, its strength, the desired press cycle time and acceptable noise levels.

The valve means preferably provide selective acceleration and deceleration of the cylinder of the press by controlling the rate of flow of fluid to the cylinder in progressive steps in response to control signals from the control means. Preferably, the valve means comprises a first bi-directional, proportional, high volume, fluid control valve which is used during rapid extension and retraction of the ram. A second proportional valve, such as a fine control servovalve, is connected in parallel with the first proportional valve and provides discrete movement of the ram in minute steps through the material sheet.

The control apparatus of the present invention also includes pump means for pressurizing the fluid from the fluid source. Preferably, the pump means is connected to a pressure regulator means, controlled by the control means, to provide a plurality of discrete pressure levels to the fluid supplied to the cylinder to selectively control the pressure exerted by the cylinder during each cycle.

The method of the present invention comprises the steps of:
(a) advancing the ram from a normally open position in which the ram is retracted from the material sheet to a first stop point within the material sheet which is less than the total thickness of the material sheet;
(b) measuring the distance of travel of the ram;

(c) controlling the supply of pressurized fluid to the cylinder to stop the advance of the ram at the first stop point;

(d) relieving the pressure on the press due to the pressurized advance of the ram through the material sheet;

(e) advancing the ram to a second position completely through the material sheet, and (f) retracting the ram from the material sheet to the open, retracted position.

Preferably, the method comprises sequentially advancing, relieving pressure on the press and then again advancing the cylinder in a plurality of discrete steps of progressing distance through the total thickness of the material sheet.

In a preferred embodiment, the pressure on the press is relieved by retracting the ram a predetermined distance from each stop point before advancing the ram to the next stop point. Preferably, the ram is smoothly accelerated and decelerated during each extension and retraction movement.

The control apparatus and method of the present invention uniquely reduces the noise and vibration levels associated with a shearing or stamping press in which a workpiece is stamped from a material sheet. By reducing noise and vibration levels, the stamping or shearing press can be located adjacent to other manufacturing operations instead of being located in a separate building or remotely from other manufacturing operations as is currently required. This eliminates the need for separate handling, shipping and storage of stamped parts between the stamping or shearing operations and further manufacturing operations.

The reduced noise and vibration levels provided by the control apparatus and method of the present invention is achieved by a simple control apparatus and method which does not significantly increase the cycle time of a stamping press.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Throughout the following description and drawing, an identical reference number is used to refer to the same component shown in multiple figures of the drawing.

The present invention is a control apparatus and method for reducing the noise and vibrations generated by energy stored in a fluid-operated press during a stamping or shearing operation.

Figure 1:
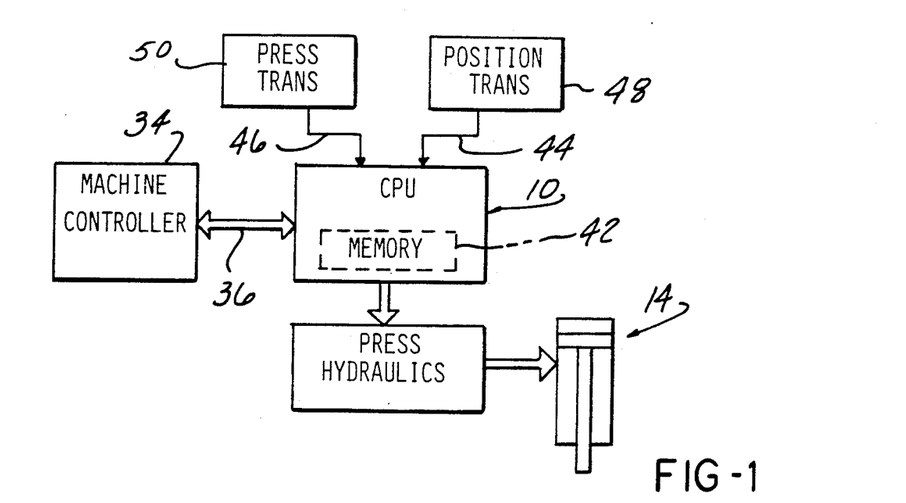
FIG. 1 is a block diagram of the control apparatus of the present invention employed to operate a fluid operated press.
Figure 2A:
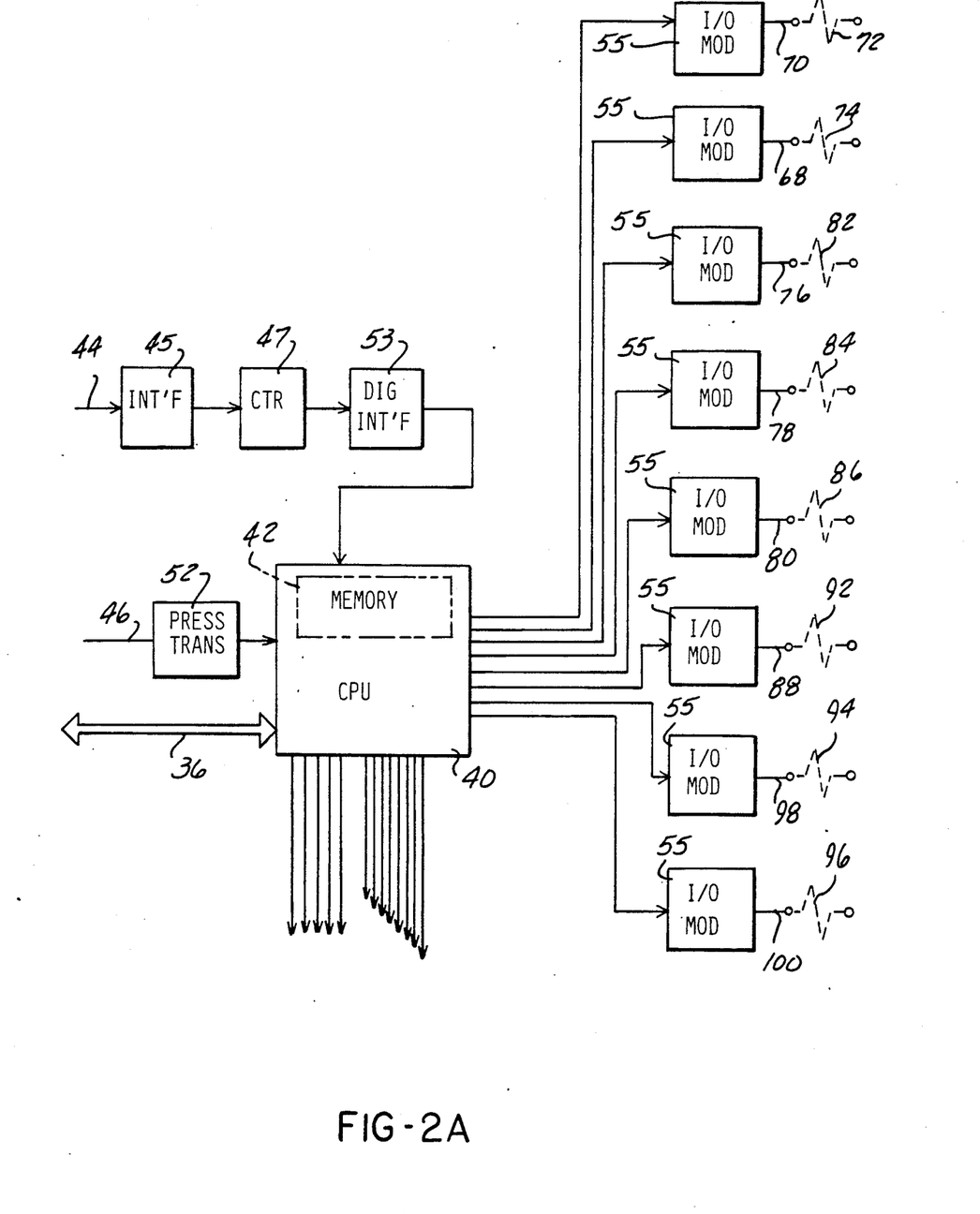
FIGS. 2A and 2B are detailed block diagrams of the control apparatus of the present invention.
Figure 2B:
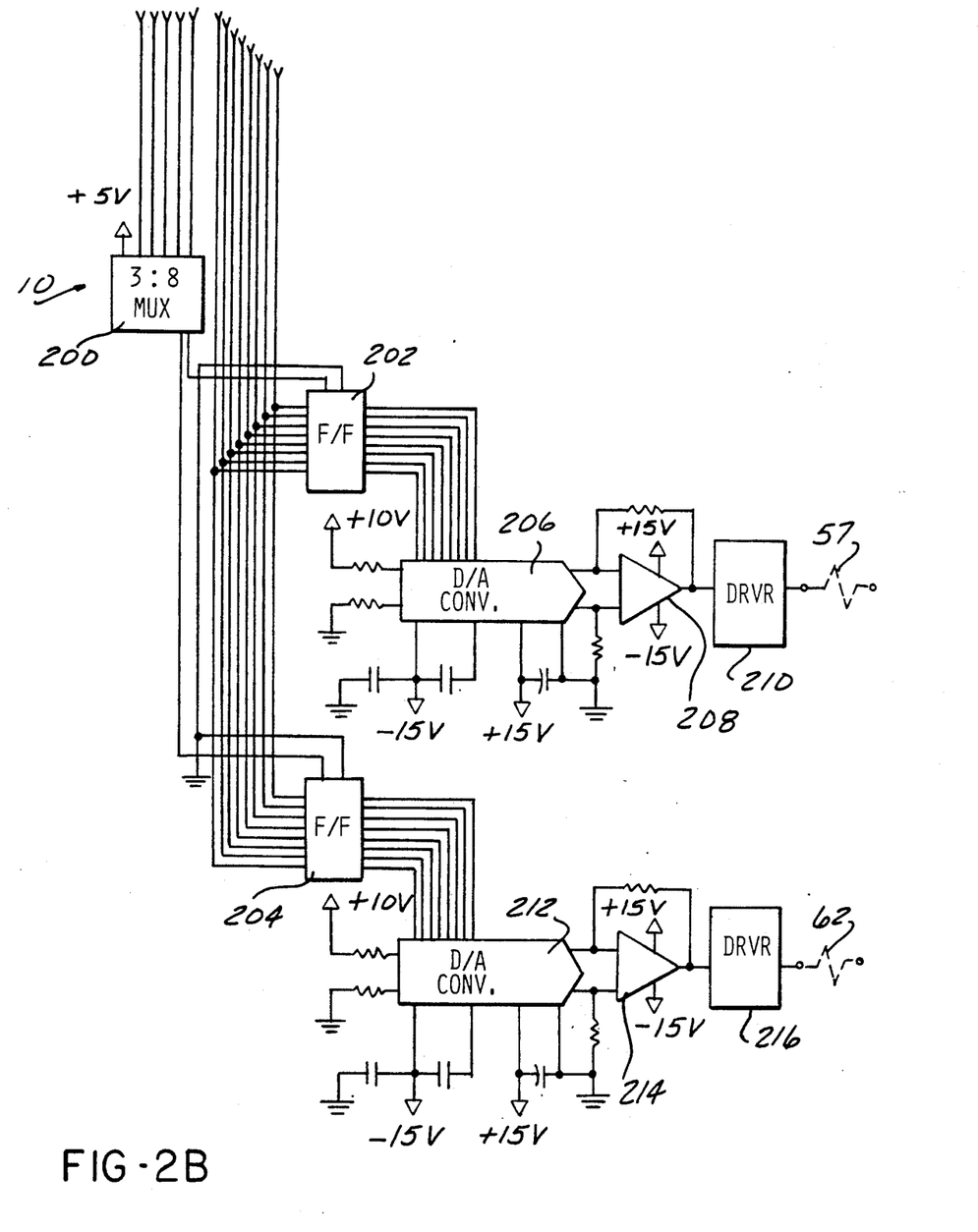
Figure 3:
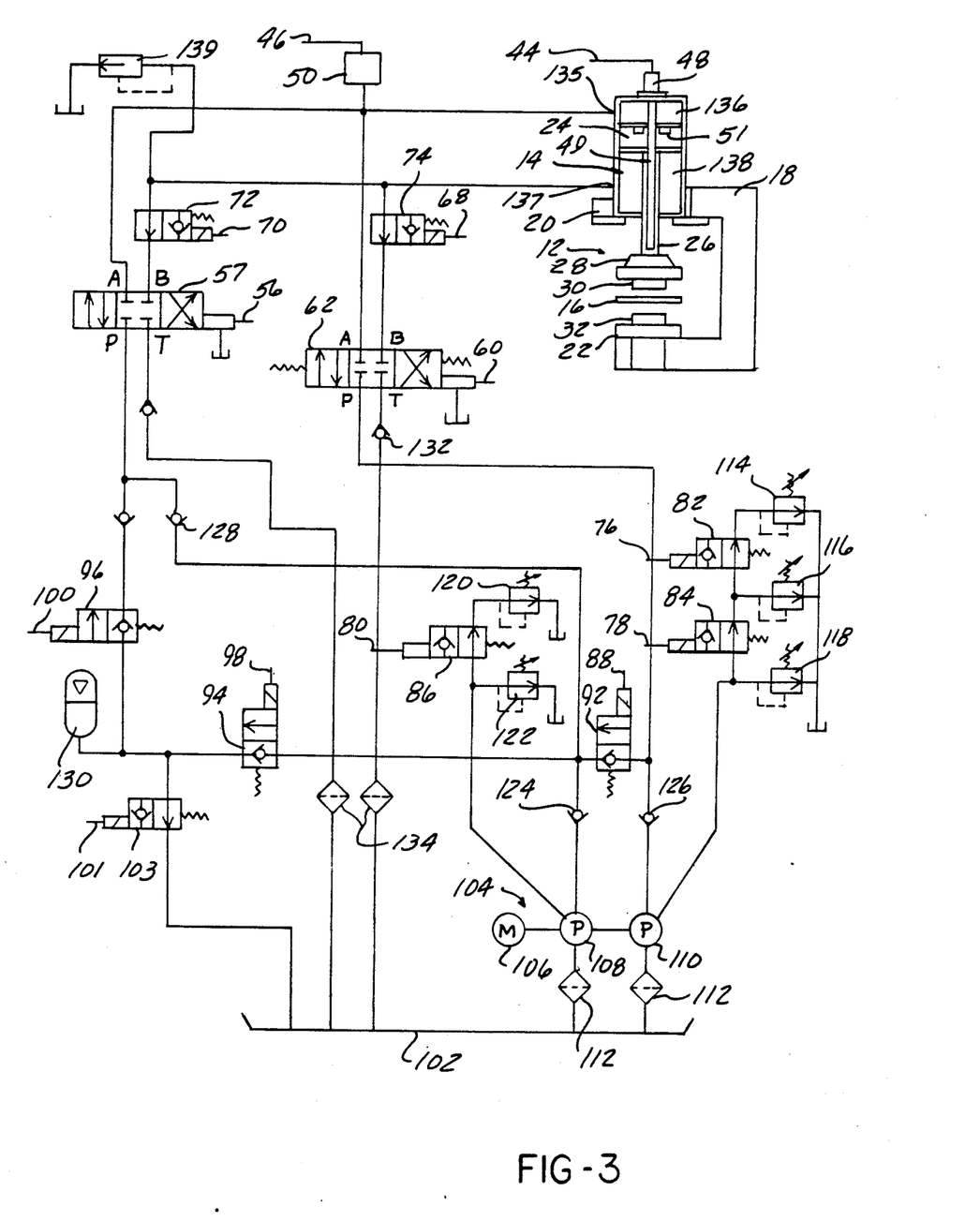
FIG. 3 is a schematic diagram of the fluid circuit of the control apparatus of the present invention.

As shown in FIGS. 1, 2 and 3, the present invention comprises a control apparatus denoted in general by reference number 10 which controls the operation of a fluid operated press 12. As described in greater detail hereafter, the press 12 includes a fluid operated cylinder 14.

Although the control apparatus 10 may be employed with any conventional fluid-operated press having one or more fluid-operated cylinders, as shown in FIG. 3 in an exemplary embodiment, the press 12 preferably includes a generally C-shaped frame 18 having spaced upper and lower portions 20 and 22, respectively. A single reciprocal cylinder 14 is mounted in the upper portion 20 of the frame 18.

The cylinder 14 includes a movable piston 24 from which extends a movable piston rod 26. The rod 26 has a ram or punch 28 mounted at an outer end which carries a first or upper die 30. A correspondingly shaped lower die 32 is mounted in the lower portion or bed 22 of the frame 18 of the press 12.

As described hereafter, the control means 10 controls the operation of the press 12 by extending and retracting the piston 24 and piston rod 26. Overall machine functions associated with the press 12 are controlled by a machine controller 34 which controls the supply of electrical power to the press 12, the starting and stopping of the hydraulic power unit, described hereafter, and conveyors or other feeding apparatus used to feed a material sheet 16 through the press 12. Preferably, by way of example only, the machine controller 34 is a programmable controller, such as a Allen-Bradley PLC2/30. The machine controller 34 communicates with the control apparatus 10 via a standard RS-232-C link 36 at 9600 baud. The signals on the link 36 provide commands to close or open the die 30 in the press 12 as well as sending various status data to the machine controller 34 depicting the operative state of the press 12.

As shown in FIGS. 1, 2A, 2B and 3, the control apparatus 10 comprises a control means or a central processing unit 40, preferably a microprocessor based computer capable of executing a control program stored in a memory 42. By way of example, the CPU 40 is an Intel SBC-88/25 single board computer utilizing a 5 Mhz. Intel 8088 microprocessor. The memory 42 is electrically connected to the central processing unit 40 for the transfer of data and signals therebetween. Inputs to the central processing unit 40 include the RS-232-C data link 36 from the machine controller 34, the output 44 of a distance measuring means or transducer 48 and the output 46 of a pressure transducer 50.

In a preferred embodiment, the distance measuring means or transducer 48 is a device capable of providing an output indicative of the distance of travel or position of the piston 24 or the piston rod 26 of the cylinder 14 on the press 12. Preferably, a Temposonics transducer, model number 011003050208, is employed in the present invention. The transducer 48 is mounted on the end of the cylinder 14 and includes an elongated wire 49 which extends through a bore formed in the piston 24 and piston rod 26. A permanent magnet 51 is mounted in or on the piston 24 and surrounds the bore and wire 49. The wire 49 is formed of a magnetostrictive material and distorts or twists under the magnetic field of the magnet 51. Pulses are sent from the transducer 48 along the wire 49 and the time interval of the return signal, which is influenced by the position of the distortion or twist in the wire 49, provides an indication of the position or distance of travel, in thousandths of an inch increments, of the piston 24 and piston rod 26 and the attached ram 28 and upper die 30.

The output signal 44 from the transducer 48, FIG. 2A, is conditioned by a Temposonics digital interface circuit 45, model number 0110030540103, and a Temposonics counter circuit 47 model number 0110030591005 before being input to the CPU 40 through an Intel digital interface circuit 53, model number SBC-519.

The pressure transducer 50 may be any type of pressure transducer capable of providing an output signal indicative of the fluid pressure in the hydraulic circuit. Preferably, the pressure transducer 50 is an Ashcroft pressure transducer model number H-K5-5-050-D-5-MRW-15-CL. As shown in FIG. 3, the pressure transducer 50 is connected to the hydraulic circuit flow path input to the cylinder 14 as described hereafter. The output from the pressure transducer 50 is an analog signal varying from one to five volts D.C. A suitable signal conditioning circuit 52 is employed with the pressure transducer 50 to convert the output signal from the pressure transducer 50 to the voltage levels required by the central processing unit 40.

A plurality of digital outputs are driven by the central processing unit 40 through I/O modules 55. The I/O modules 55 provide signal conditioning and compatible voltage levels and may be I/O modules sold by Opto-22 and others.

The central processing unit 40 generates outputs to I/O modules 55 which respectively generate output signals 68 and 70 which are supplied to blocking valves 72 and 74 respectively associated with a proportional valve 57 and a servo-valve 62.

Pump pressure is provided by the central processing unit 40 via outputs to a pump control valve circuit which generates a plurality of discrete pressure signals denoted by reference numbers 76, 78 and 80 which are connected to pump control valves 82, 84 and 86, respectively, shown in FIG. 3 and described in detail hereafter. The output signals 76, 78 and 80 are digital in nature and vary between zero and +24 volts D.C.

The central processing unit 40 also generates an output signal 88 through an I/O module 55 to control a combined pump flow valve 92, the purpose of which will be described in greater detail hereafter. The signal 88 varies between zero and +24 volts D.C.

Finally, accumulator charge and discharge valves 94 and 96 are controlled by control signals 98 and 100, respectively, generated by I/O modules 55 controlled by output signals from the central processing unit 40. The output signals 98 and 100 are digital signals ranging between zero and +24 volts D.C. and are used to charge and discharge an accumulator, described hereafter.

Analog outputs are provided by the CPU 40 to drive the proportional valve 57 and the servo-valve 62 to provide varying rates of fluid flow to the cylinder 14. As shown in FIG. 2B, the CPU 40 generates select signals to a 3:8 multiplexor 200. The multiplexor 200 provides output signals selecting one of two digital/analog converters. Thus, one output from the multiplexor 200 is directed to a first octal flip-flop 202; while a second output from the multiplexor 200 is connected to a second octal flip-flop 204. Digital data in the form of an eight bit word is output from the CPU 40 on the ISBX port on the SBC88/25 computer and is latched into the flip-flops 202 or 204 as selected by select data from the multiplexor 200. The data in the flip-flop 202 is clocked into a digital/analog converter 206. The output of the digital/analog converter 206 is a plus or minus 10 volt D.C. signal which is amplified by an amplifier 208 and input to a driver circuit 210, such as a driver circuit formed of valve drive circuits sold by Bosch, model numbers 0811405026 and 0811405027. Such driver circuits are primarily current drivers matched to the proportional valve 57.

A similar circuit is provided for the servo-valve 62 in which the output of the flip-flop 204 is connected to a digital/analog converter 212. The output of the digital/analog converter 212 is amplified by an amplifier 214 and input to a driver circuit 216, such as a current driver, matched to the servo-valve 62. The driver circuit 216 may be any suitable current driver circuit such as one sold by Dyval, model number 23-5030.

Referring now to FIG. 3, there is depicted a hydraulic circuit containing elements controlled by the control means 10 in controlling the extension and retraction of the piston 24 and piston rod 26 on the press 12. A source 102 of fluid, such as hydraulic fluid, provides a supply of fluid to the hydraulic circuit. The source 102 is mounted above the motor 106 and the pumps 108 and 110 for gravity prime and flow considerations. Pump means 104 are provided for supplying fluid from the source 12 to the cylinder 14 on the press 12. Preferably, the pump means 104 comprises a motorpump unit having a motor 106 driving a first pump 108 and a second pump 110. Both of the pumps 108 and 110 are connected through filters 112 to the source 102. In a preferred embodiment, the motor 106 is a 40 h.p., 3 phase, 1200 rpm motor. The first pump 108 is a 40 g.p.m. high volume pump used for rapid advance and retraction of the piston 24. The second pump 110 is a 10 g.p.m. high pressure pump.

The valves 82, 84 and 86 comprise a means for pressurizing the pumps 108 and 110. Preferably, three valves 82, 84 and 86 in the form of 24 volts D.C., solenoid-operated cartridge valves are employed to generate three distinct pressure levels. For example, cartridge valves manufactured by Hydra-Force, model number SV-16-22-O-N-24DG may be employed.

Pilot operated pressure valves 114, 116 and 118 are connected between the source 102 through valves 82 and 84 and the regulator port of the second pump 110. Each of the pressure regulator valves 114, 116 and 118 is set to a different predetermined pressure, such as 600 psi for the first pressure regulator valve 114, 2000 psi for the second regulator valve 116 and 2800 psi for the third regulator valve 118.

A similar pressure regulating circuit formed of pressure regulating valves 120 and 122 is connected through the pump control valve 86 connected to the regulator port of the first pump 108. The valves 120 and 122 provide two distinct preset pressures of 600 psi and 2000 psi for the first pump 108. The outputs from the pumps 108 and 110 are connected through check valves 124 and 126, respectively, to the pressure input or inlet of the proportional valve 57 and the servo-valve 62, respectively. A second check valve 128 is connected in series with the check vavle 124.

A combine pump valve 92 in the form of a two-way, 24 volt D.C., solenoid-operated, cartridge valve, under the control of the control means 10, is connected between the check valves 124 and 126 as shown in FIG. 3. The purpose of the combine pump valve 92 is to combine the output of the pumps 108 and 110 to supply pressurized fluid at a predetermined pressure to either of the proportional valve 57 or the servo-valve 62. The pressure is selected depending upon which one of the pressure control valves 82, 84 and 86 is energized.

The output of the combine pump valve 92 is also connected to an accumulator 130 through an accumulator charge valve 94. The accumulator 130 provides additional fluid volume during rapid advance and return of the piston 24 in the cylinder 14. The accumulator 130 is precharged on the gas side with 1200 p.s.i.g. of nitrogen.

The accumulator charge valve 94 is a 24 volt D.C., solenoid-actuated, two-way, cartridge valve, connected to the accumulator 130 to charge the accumulator 130 to the preset pressure provided by the first pump 108. A similar type of valve is employed as the accumulator discharge valve 96 also connected to the accumulator 130. The outlet of the discharge valve 96 is connected in parallel with the outlet of the combine pump valve 92 to the pressure inlet of the proportional valve 57.

A safety relief valve 103 is a 24 volt D.C., solenoid-actuated, two-way, cartridge valve connected between the charge valve 94 and the outlet of the accumulator 130 and enables the accumulator 130 to be drained for safety reasons when power is removed from the press 12. During normal operation, the safety dump valve 103 is actuated by a control signal from the machine controller 34 to block flow from the accumulator 130 to the tank 102.

The control apparatus 10 also includes valve means for controlling the direction of fluid flow into the cylinder 14 to extend and retract the ram 28. Although a single, constant volume valve may be used, it is preferred that a proportional valve be employed in the present invention to provide varying fluid flow rates to the cylinder 14. This provides controlled acceleration and deceleration of the ram 28 in response to control signals from the control means 40.

In a preferred embodiment, the valve means includes the bi-directional proportional valve 57 for high volume flow during rapid extension and retraction of the ram 28 to and from the material sheet 16 and the bi-directional servo-valve 62 for fine control during advance of the ram 28 through the material sheet 16.

The proportional valve 57 is a four-way, blocked center, solenoid operated, valve which provides varying amounts of pressurized fluid to the cylinder 14 of the press 12. By way of example, the proportional valve 57 is a Bosch valve, model number 0811404401. The pressure inlet of the proportional valve 57 is connected to the parallel combination of the output of the accumulator 130 and the output of the combine pump valve 92 through check valves as shown in FIG. 3. The A outlet of the proportional valve 57 is connected to a port 135 on the cylinder 14 which communicates with the extension chamber 136 of the cylinder 14. The B outlet of the valve 57 is connected through a blocking valve 72 to another port 137 on the cylinder 14 which communicates with the retraction chamber 138 of the cylinder 14.

A similar hydraulic circuit is provided for the servo-valve 62 which also comprises a four-way, blocked center, solenoid operated, valve. By way of example, the servo-valve 62 is one sold by Dyval as model number 15. The pressure inlet of the servo-valve 62 is connected to the combine pump valve 92 and the tank inlet is connected through a check valve 132 and a filter 134 to the tank or fluid source 102. A blocking valve 74 is connected between the B outlet of the servo-valve 62 to the port 137 of the cylinder 14. The A outlet of the servo-valve 62 is connected in parallel with the A outlet of the proportional valve 57 to the port 135 of the cylinder 14.

As shown in FIG. 3, the pressure transducer 50 is connected to the common connection of the A outlets of the valves 57 and 62 and the port 135 of the cylinder 14.

The blocking valves 72 and 74 are two-way, 24 volt D.C., solenoid-actuated, cartridge valves and are used to prevent the die 30 from drifting downward when the pump means 104 is de-energized. The blocking valves 72 and 74 are also employed to prevent or stop downward motion of the ram 28 and die 30 during an emergency stop or when the control is not in manual or automatic mode of operation.

A safety relief valve 139 is connected to the outlet of the blocking valve 72 and set to open at a predetermined pressure, such as 3000 psi, to eliminate surges in the hydraulic circuit.

It will be understood that the present control apparatus and method are described for example purposes as controlling one cylinder in a press. In this example, the proportional valve 57, the servo-valve 62, the blocking valves 72 and 74, the pressure transducer 50, the distance measuring transducer 48 and the accumulator discharge valve 96 are specifically dedicated to the cylinder 14. These elements must be duplicated for each cylinder in a press controlled by the control apparatus 10 of the present invention, such as a multi-stage, progressive press containing a plurality of cylinders, rams and dies. The accumulator 130, pump means 104 and the pressure regulating valves 82, 84 and 86 will be common for all such cylinders in a multi-stage press.

Figure 4:
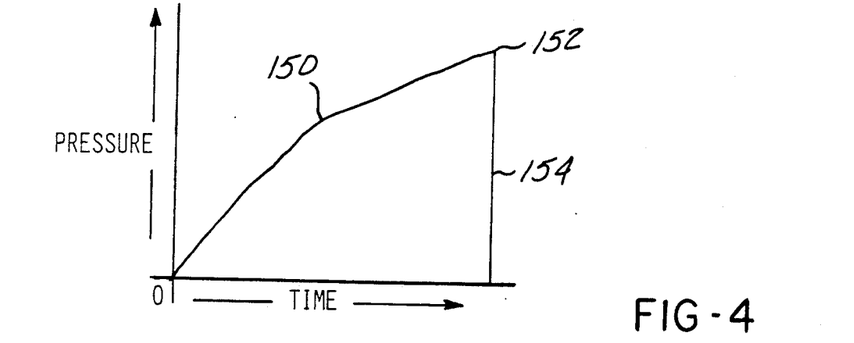
FIG. 4 is a graph depicting pressure or press force as a function of time during one cycle of a press.
Figure 5:
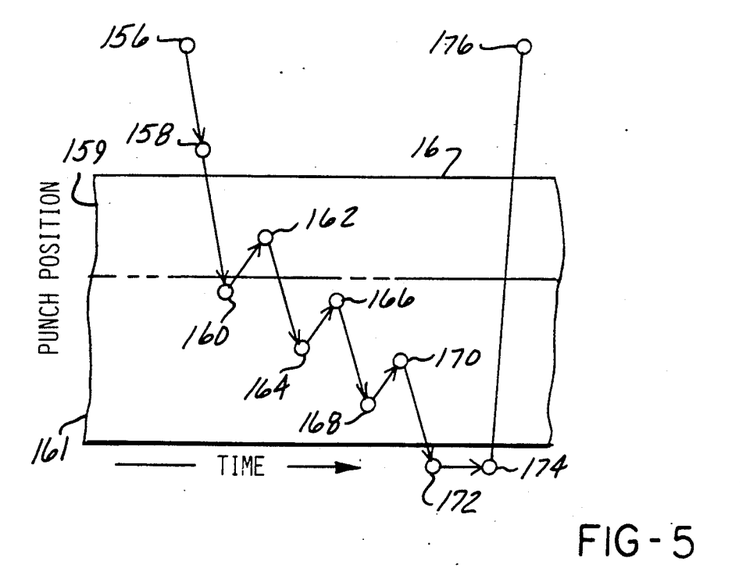
FIG. 5 is a graph depicting ram position as a function of time during one cycle of the press.

Before describing the detailed operation of the control apparatus and method of the present invention, a brief description of the pressures or forces and the sequence of operation involved in shearing or stamping a workpiece from a material sheet will be first described in conjunction with FIGS. 4 and 5. FIG. 4 is a graph of pressure versus time in a shearing operation. The pressure is the force imparted to the press and dies during the shearing operation and linearly increases from the start of the operation cycle to a point 150 at which the material sheet 16 starts to give. The pressure buildup continues from point 150, but at a lesser rate, until material breakthrough occurs, as indicated by point 152. After breakthrough, the stored energy is rapidly released and the pressure drops as indicated by reference number 154. It is this rapid release of energy during a short time interval that results in the high noise and vibration levels associated with a stamping or shearing operation.

The control apparatus 10 and method of the present invention reduces such noise and vibration levels by progressively releasing the stored energy in a plurality of steps in a single press cycle thereby resulting in lower noise levels at each step and a total noise level less than that associated with a single step stamping or shearing of a metal sheet.

FIG. 5 is a graph depicting the position of the ram 28 with respect to time during a single press cycle. In FIG. 5, the circles indicated by various reference numbers depict the position of the ram 28 and upper die 30 at each step during a single press cycle. These circles are referred to as "set points". The set points indicated by reference numbers 156 and 176 are zero set points indicating an open position of the dies 30 and 32, with the piston 24 in the cylinder 14 fully retracted.

Figure 6:
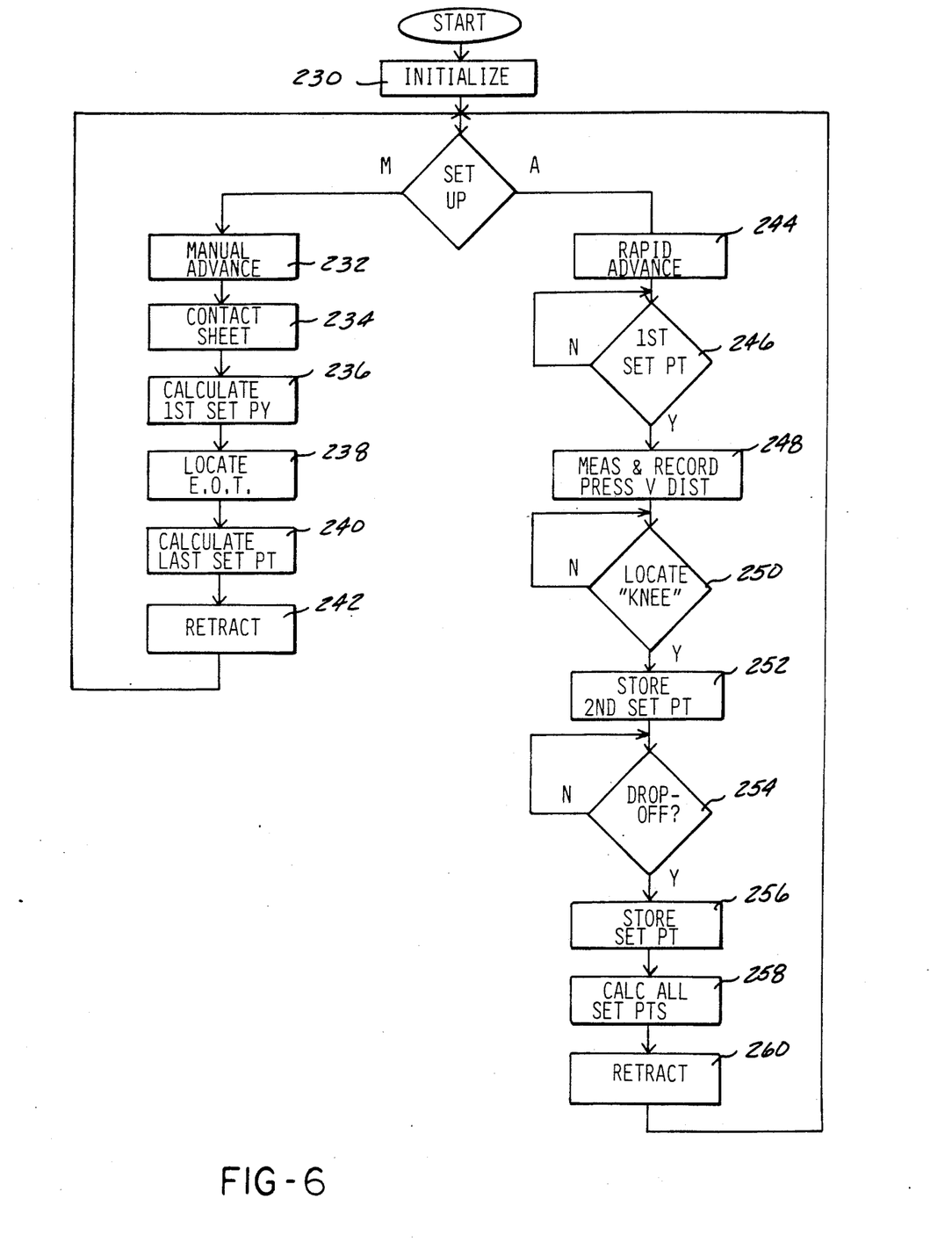
FIG. 6 is a flow chart depicting the "self teach" mode of operation of the control program executed by the control apparatus of the present invention in establishing the set points.

In operation, the control means 40 executes a control program stored in the memory 42. The control means 40 initially executes a "self teach" or setup sequence to locate the set points to be used to sequentially advance the ram 28 through the material sheet 16. The "self teach" flow chart is depicted in FIG. 6 which, after a start and initialization step 230 enters a manual mode. In this mode, step 232, the ram 28 is manually advanced toward the top surface of the material sheet 16. When the ram 28 contacts the top surface of the material sheet 16, step 234, the first set point, denoted by reference number 158 in FIG. 5, is calculated in step 236 by the control means 40. A point up to 0.050 inches above the top surface of the material sheet 16 is selected for the first set point 158.

The ram 28 is advanced through the material sheet 16 to locate an end of travel position, step 238. The end of travel position is located by monitoring the pressure output of the pressure transducer 50 and distance, such as when the pressure exceeds a second pre-set value and remains there for ten seconds with less than 0.002 inch increment in distance. A point 0.01 inch before this location is calculated and stored in the memory 42 as the last set point, denoted by reference number 172 in FIG. 5. This occurs in step 240 as shown in FIG. 6. Step 242 causes retraction of the ram 28 to the normal, fully opened, retracted position.

Once the first and last set points 158 and 172 have been calculated, the control means 40 enters an automatic "self teach" or setup mode of operation to determine and calculate the remaining set points. In step 244, the ram 28 is rapidly advanced toward the material sheet 16. The control means 40 monitors the output of the distance measuring transducer 48 to determine when the ram 28 has reached the first set point as shown in step 246 and evidenced by set point 158 in FIG. 5. At this point, the control means 40 records the output of the pressure transducer 50 and stores the pressure output in the memory 42 for each 0.002 inch increment of distance travel of the ram 28 in step 248.

This forms a pressure/distance chart in the memory 42 which is a series of pressure values stored sequentially in the memory 42 for each incremental distance of advance and is used to monitor machine performance during a normal cycle.

Upon further advance of the ram 28 through the material sheet 16, the control means 40 constantly monitors the pressure output from the transducer 50 to locate the "knee" of the pressure curve or point 150 in FIG. 4 as shown in step 250 in the flow chart of FIG. 6. When point 150 is located, the control means 40 stores the distance measurement as the second set point, indicated by reference number 160 in FIG. 5. This corresponds to the transition from the shear to fracture zone within the material sheet 16.

The control means 40 continues to monitor the output of the pressure transducer 50 to locate the drop-off point 152, shown in FIG. 4. This point 152 corresponds to the final fracture of the material sheet as shown in step 254. When point 152 is located as evidenced by a sharp decrease in the pressure values from the transducer 50, the control means 40 stores the corresponding distance as a set point, indicated by reference number 168 in FIG. 5.

The distance between the "knee" point 150 and the "drop-off" point 152 on the pressure/time curve of FIG. 4 is divided by a predetermined number of steps to calculate the remaining set points, such as set point 164, shown in FIG. 5 and set forth in step 258 in FIG. 6. Finally, the ram 28, after reaching the end of travel set point 172 is retracted to the fully opened position.

The remaining set back set points 162, 166 and 170 in FIG. 5 are calculated by using a predetermined set back distance which is substracted from the next advanced set point, such as set point 164 for the set back set point 162, set point 168 for the set point 166 and the set point 172 for the set back set point 170. This determines the amount of reverse or retraction movement of the ram 28 between each successive advance, as described in greater detail hereafter. The predetermined set back distance is calculated by examining machine and die distortion to determine a distance required to relieve all of the stored energy in the press 12 caused by the pressurized advance of the ram 28 through the material sheet 16.

Figure 7:
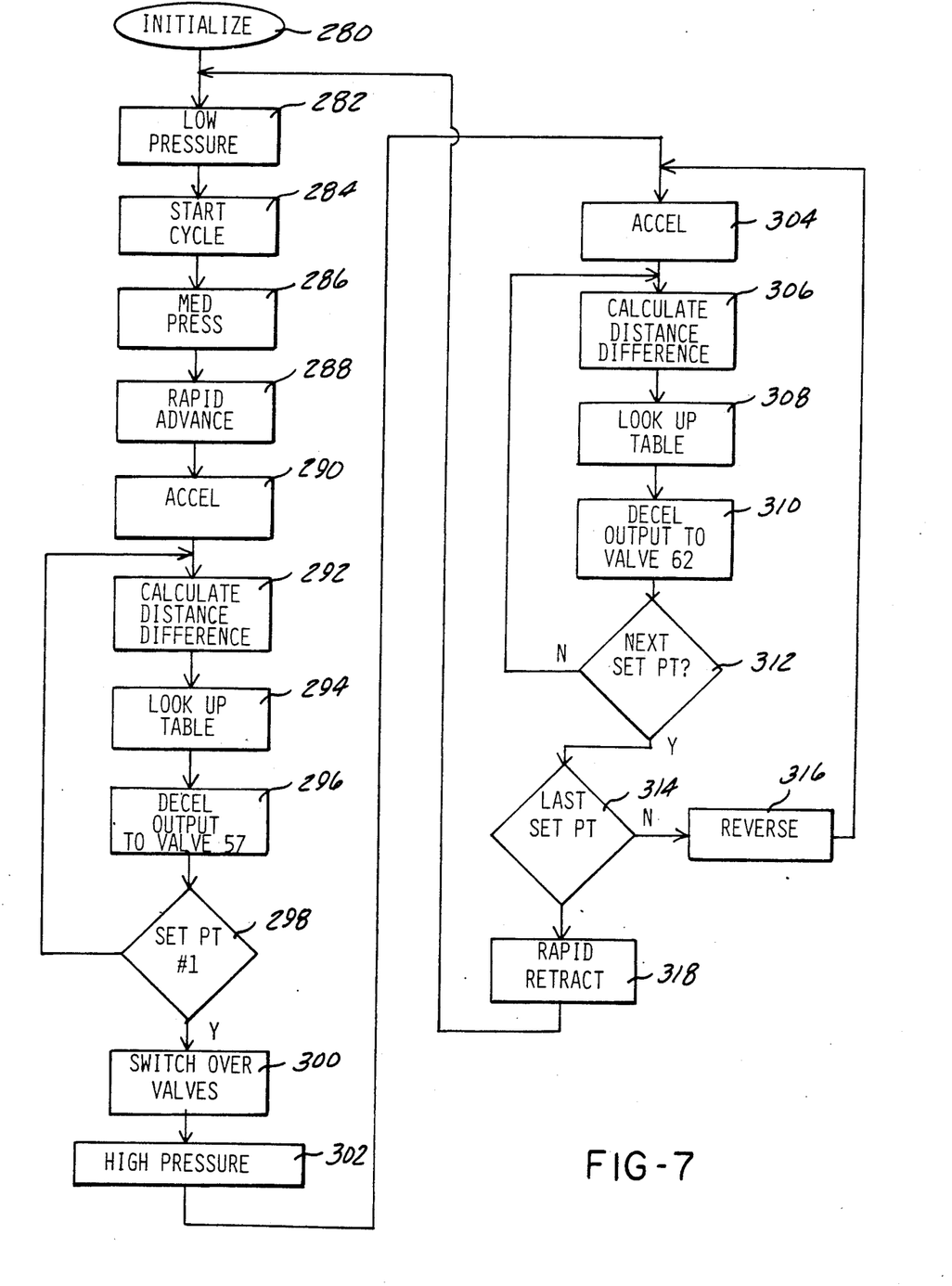
FIG. 7 is a flow chart depicting the automatic mode of operation of the control program executed by the control means.

In an automatic operation mode, the control means 40 executes an automatic sequence shown generally in FIG. 7. After initializing the hydraulic circuit in step 280, the press 12 is situated in the fully opened, retracted position.

Starting with the first set point 156, the piston 24 is fully retracted and the pump means 104 is energized at low pressure (600 p.s.i.g.), step 282, to limit starting torque and in rush current of the motor 106.

The control means 40 then starts a press cycle, step 284 and generates control signals to the various valves to energize the pumps 108 and 110 at medium pressure (2000 p.s.i.g.), step 286, by activating regulating valves 82 and 86. The combine pump valve 92 is closed (off) and the accumulator charge valve 94 is opened to charge the accumulator 130. The accumulator discharge valve 96 is closed or off as are the proportional and servo-valves 57 and 62.

To rapidly advance the ram 28 toward the material sheet 16, step 288, the control means 40 holds the servo-valve 62 and the accumulator charge valve 94 off. The accumulator discharge valve 96 and the combine pump valve 92 are opened to supply 2000 p.s.i.g. to the proportional valve 57 from the pumps 108 and 110.

The control means 10 generates a signal 56 to the proportional valve 57 which opens the proportional valve 57 to a full open position in ten incremental steps, each of ten milliseconds in length. This creates an acceleration curve, step 290, to minimize shock and noise while maximizing speed and performance. As the ram 28 approaches the first set point 158, the control means 40 constantly monitors the output of the distance measuring transducer 48 and calculates the distance difference, in step 292, between the current position of the ram 28 and the next set point, such as set point 158 in FIG. 5. As mentioned above, the distance difference is utilized as a pointer to the pressure/distance chart stored in the memory 42 of the control means and calculated during the "self teach" procedure. The distance difference is the difference between a dimension in the pressure/distance chart range and the next set point, such as set point 158. The actual dimension is in 0.0005 inch increments. The lookup table for the first set point 158 contains 32 separate pressure/distance measurements or values for the proportional valve 57. The result of the subtraction of the actual distance versus the distance of the first set point 158 is calculated and divided by four. This value is used in the lookup table, step 294, to locate the proper corresponding pressure value from the pressure/distance chart stored in the memory 42. This value is employed by the control means 40 to generate an output signal to the proportional valve 57 to control and progressively decrease the amount of fluid flow through the flow valve 57 to the cylinder 14 to smoothly decelerate the extension of the ram 28. This process is repeated until the first set point 158 is reached in step 298. The deceleration of the cylinder 14 caused by the proportional valve 57 does not stop forward motion of the ram 28; but rather slows the forward motion of the ram 28 to that of a full servo output which is ⅛th to 1/10th of the full proportional valve output.

After reaching set point 158, switchover to the servo-valve 62 takes place, step 300, and the servo-valve 62 is energized to a full open position in three incremental steps of ten milliseconds, each by successive control signals 60 from the control means 10. Simultaneously, the proportional valve 57 is closed the remaining amount in three incremental steps thereby providing a smooth transition from rapid advance to forward under high pressure control. The control means 40 also switches the pump means 104 to a high pressure (2800 p.s.i.) in step 302.

Advancing from the set point 158 to the next set point 160, the first die 30 passes through the shear range 159 of the thickness of the material sheet 16 as shown in FIG. 5 into the fracture range denoted by reference number 161. In this portion of the cycle, the control means 40 deenergizes the combine pump valve 92, energizes and opens the accumulator charge valve 94 and closes the accumulator discharge valve 96. The first pump 108 is maintained at medium pressure (2000 p.s.i.g.) to charge the accumulator 130.

The control means 40 also generates signals to close valves 82 and 84 and to set pump 110 at a high pressure of 2800 p.s.i.g. Further, the proportional valve 57 is closed in a timed sequence and the servo-valve 62 is used to control the extension and retraction of the piston 24 and ram 28. In step 304, the servo-valve 62 is energized by the controller 40 to a full open position in three incremental steps of ten milliseconds each for acceleration of the ram 28 between set points 158 and 160. A deceleration operation based on the distance from the set point 160 as measured by the transducer 48 is used to control the advance or retraction to each set point. The deceleration operation is similar to that described above and includes a calculation of the difference between the actual position of the ram 28 and the next set point 160, step 306, using the difference as a pointer in a lookup table, step 308, similar to the lookup table described above but containing only eight valves for the servo-valve 62 to generate output signals to the servo-valve 62, to smoothly decelerate the ram 28 to a stop at the next set point, step 312. Upon reaching the set point 160, a control signal 60 from the CPU 40 reverses the servo-valve 62, step 316, to retract the ram a predetermined distance from the set point 160 to set point 162. During such travel, the servo-valve 62 is ramped open and closed to smoothly accelerate and decelerate the ram 28 through steps 304, 306, 308, 310 and 312. These steps are repeated for the set points 164, 166, 168, 170 until the die 30 breaks through the material sheet 16 and reaches the final set point 172 in step 314.

In each retraction step, the energy transferred from the pressurized cylinder 14 and punch 28 to the frame 18 of the press 12 is relieved thereby minimizing overall noise and vibration generated by the press 12 during its operation. The control means 40 includes means for relieving the pressure or force built up in the press 12 due to the pressurized advance of the ram 28 through the material sheet 16. In a preferred embodiment, the relieving means is implemented through a retraction of the ram 28 from each advance set point. However, it will be understood that the relieving means could also be implemented without such retraction by relieving the pressure on the cylinder 13 extending the ram 28 upon reaching each advance set point.

It should also be noted that the example illustrated in FIG. 5 discloses four progressive steps of increasing distance through the thickness of the material sheet 16, with retractions to an intermediate set point between each progressive advance. This is by way of example only and the number of steps to actually shear or stamp a workpiece from the material sheet 16 are selected based on the thickness of the sheet 16, its strength as determined by its alloy or material makeup, as well as the desired cycle time and acceptable noise levels of the press 12. More or less steps could be employed in the progressive fracture method of the present invention as needed.

Upon reaching the breakthrough set point 172, the press 12 enters a dwell cycle in which the first die 30 is maintained at its bottomed out position in the second die 32. The dwell may be of any time length, such as 0.5 seconds at high pressure of 2800 psi. During this dwell cycle, the servo-valve 62 is maintained at a half open position by suitable control signals 60 from the CPU 40. The valve 62 is fully closed at the end of the dwell cycle as indicated by set point 174. To retract to the full open set point 176, the CPU 40 generates a control signal 56 to the proportional valve 57 opening the proportional valve 57 to a full open position while closing the servo-valve 62 to rapidly retract the ram 28 toward the set point 176, step 318. A predetermined distance before reaching the set point 176, the controller generates a signal 56 to the proportional valve 57 gradually decreasing the flow through the proportional valve 57 to decelerate the ram 28 to the zero set point indicated by reference number 176. The pressure during rapid return or retract is the same as during rapid advance.

In summary, there has been disclosed a unique control apparatus and method for progressively fracturing workpieces from material sheets in which the noise and vibration typically generated during such an operation is significantly reduced. The control apparatus and the method progressively advances the ram of the press in a successive series of steps, each of increasing distance through the thickness of the material sheet, and relieves the pressure or force built up in the press caused by the pressurized advance of the ram through the material sheet at each step. Thus, the pressure built up in the press during each cycle is released at low levels progressively through each cycle.

What is claimed is:

1. A control apparatus for controlling a fluid-operated cylinder pressurizable with a fluid from a fluid source for moving a ram in a press to shear a workpiece from a material sheet having a predetermined thickness comprising:

valve means for controlling the direction of fluid flow into the cylinder to extend and retract the ram with respect to the cylinder;

means for measuring the travel distance of the ram, the distance measuring means generating an output indicative of such travel distance; and control means, executing a stored control program in response to the output of the distance measuring means, for controlling the valve means to progressively advance the ram in discrete steps, each of an increasing distance through the total thickness of the material sheet, the control means including:

means for advancing the ram a first predetermined distance through the material sheet, the first distance being less than the total thickness of the material sheet and corresponding to the start of fracture of the material sheet;

means for stopping the advance of the ram at the first predetermined distance in the material sheet; and means for advancing the ram a second distance completely through the material sheet to sever the workpiece from the material sheet.

2. The control apparatus of claim 1 wherein the means for stopping the ram comprises:

means for decelerating the ram to a full stop at the first predetermined distance.

3. The control apparatus of claim 1 further including:

means for accelerating and decelerating the ram during each extension and retraction of the cylinder.

4. The control apparatus of claim 1 further including:

means for relieving the pressure on the press due to the pressurized advance of the ram through the material sheet.

5. The control apparatus of claim 4 wherein the relieving means comprises:

the control means controlling the valve means to supply fluid to the cylinder to retract the ram a predetermined distance from each predetermined advance stop distance of the ram through the material sheet.

6. The control apparatus of claim 1 further including:

means for pressurizing the fluid supplied to the cylinder in a plurality of distinct pressures.

7. The control apparatus of claim 6 wherein the supplying means supplies three distinct pressures.

8. The control apparatus of claim 1 wherein the means for measuring the travel distance comprises:

a transducer connected to the cylinder for measuring the position of travel of the ram attached to the cylinder.

9. The apparatus of claim 1 further including:

means for determining when the material sheet starts to fracture under the advance of the ram through the material sheet.

10. A control apparatus for controlling a fluid-operated cylinder pressurizable with a fluid from a fluid source for moving a ram in a press to shear a workpiece from a material sheet having a predetermined thickness comprising:

a bi-directional, proportional fluid control valve means connected between the fluid source and the cylinder and controlling the rate and direction of fluid flow to the cylinder to extend and retract the ram;

means for measuring the travel distance of the ram, the distance measuring means generating an output indicative of such travel distance; and control means, executing a stored control program in response to the output of the distance measuring means, for controlling the valve means to progressively advance the ram in discrete steps, each of an increasing distance, through the total thickness of the material sheet; the control means comprising:

means for stopping the advance of the ram at a first predetermined distance in the material sheet, the first distance corresponding to the start of fracture of the workpiece;

means for relieving the pressure on the press due to the pressurized advance of the ram through the material sheet, the relieving means including the control means generating signals to the valve means to retract the ram a predetermined distance from each predetermined advance distance of the ram through the material sheet; and means for accelerating and decelerating the ram during each extension and retraction of the ram, the accelerating and decelerating means including the control means generating signals to the valve means to progressively vary the rate of fluid flow to the cylinder.

* * * * *